United States Patent
Yang

(10) Patent No.: US 8,503,341 B2
(45) Date of Patent: Aug. 6, 2013

(54) CLIENT DEVICE

(75) Inventor: Dingzhou Yang, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 394 days.

(21) Appl. No.: 12/811,061

(22) PCT Filed: Dec. 29, 2007

(86) PCT No.: PCT/CN2007/003966
§ 371 (c)(1),
(2), (4) Date: Jun. 28, 2010

(87) PCT Pub. No.: WO2009/086674
PCT Pub. Date: Jul. 16, 2009

(65) Prior Publication Data
US 2010/0290377 A1    Nov. 18, 2010

(51) Int. Cl.
*H04B 7/00*    (2006.01)

(52) U.S. Cl.
USPC .......................................................... 370/310

(58) Field of Classification Search
None
See application file for complete search history.

(56) References Cited

U.S. PATENT DOCUMENTS

| | | | |
|---|---|---|---|
| 7,317,708 B2* | 1/2008 | Moon et al. | 370/331 |
| 8,050,206 B2* | 11/2011 | Siann et al. | 370/310 |
| 8,050,242 B2* | 11/2011 | Lipford et al. | 370/338 |
| 8,095,099 B2* | 1/2012 | Patel et al. | 455/183.1 |
| 2006/0098614 A1* | 5/2006 | Moon et al. | 370/338 |
| 2007/0135162 A1* | 6/2007 | Banerjea et al. | 455/556.1 |
| 2007/0195764 A1* | 8/2007 | Liu et al. | 370/389 |
| 2007/0230427 A1* | 10/2007 | Arseneault et al. | 370/340 |
| 2007/0249403 A1* | 10/2007 | Gao et al. | 455/562.1 |
| 2007/0286079 A1* | 12/2007 | Mollenkopf et al. | 370/236 |
| 2008/0095085 A1* | 4/2008 | Goodjohn | 370/310 |
| 2008/0130531 A1* | 6/2008 | Chou | 370/310 |
| 2008/0205359 A1* | 8/2008 | Rofougaran | 370/338 |
| 2008/0207258 A1* | 8/2008 | Rofougaran | 455/552.1 |
| 2008/0212503 A1* | 9/2008 | Lipford et al. | 370/310 |
| 2008/0220807 A1* | 9/2008 | Patel et al. | 455/524 |
| 2008/0253342 A1* | 10/2008 | So et al. | 370/338 |
| 2009/0059899 A1* | 3/2009 | Bendelac | 370/352 |
| 2009/0141683 A1* | 6/2009 | Grinshpun et al. | 370/331 |

FOREIGN PATENT DOCUMENTS

| | | |
|---|---|---|
| CN | 1859442 A | 11/2006 |
| CN | 1889522 A | 1/2007 |

OTHER PUBLICATIONS

P.R. China, State Intellectual Property Office, International Search Report for International Application No. PCT/CN2007/003966, mailed Oct. 9, 2008.
P.R. China, State Intellectual Property Office, First Office Action for CN App. No. 200780102074.4, dated Jul. 26, 2011.

* cited by examiner

*Primary Examiner* — Jay P Patel
(74) *Attorney, Agent, or Firm* — Bright IP Law Offices

(57) ABSTRACT

A client device is provided, including: a WiMAX access module for accessing a WiMAX network, and receiving a WiMAX wireless data from the WiMAX network; a switching module for being connected between the WiMAX access module and a network processor, and realizing transparent data transmission between the WiMAX access module and the network processor; the network processor for processing the WiMAX wireless data received from the switching module.

4 Claims, 2 Drawing Sheets

CLIENT DEVICE

FIELD OF THE INVENTION

The present invention relates to wireless communication technology field, in particular to a CPE (Customer Premises Equipment) for the WiMAX (Worldwide Interoperability for Microwave Access Forum).

BACKGROUND OF THE INVENTION

WiMAX technology has been developed rapidly in recent years due its advantages in bandwidth and convenience of building wireless network, especially in data application field including data transmission bearer and data access. WiMAX technology products in commercial field mainly comprise data card and CPE access products due to its features.

Currently, there are many providers providing various commercial WiMAX chips with different interfaces including USB interface, MII (Media Independent Interface) interface, SDIO (Secure Digital Input/output) interface and PCM-CIA interface. MII interface has been widely applied to network devices due to its flexibility, by which, WiMAX chips can be easily connected to various network devices.

Currently, the connection mode of WiMAX CPE based on MII interface is shown in FIG. 1, wherein a WiMAX access module connects to and communicates with a network processor via MII interface, while the network processor provides another MII interface connecting to the NetPHY and being converted into a standard RJ45 for communicating with external network device. This structure has two disadvantages, 1) the network processor in the CPE being required to have two separate MII interfaces; 2) poor extensibility, which results in a substantial modification of scheme when the user wants to provide a plurality of network interfaces.

SUMMARY OF THE INVENTION

With respect to one or more of above problems, the present invention provides a client device.

The client device according to the present invention comprises: a WiMAX access module, used to access a WiMAX network and receive the WiMAX wireless data from the WiMAX network; a switching module, used to be connected between the WiMAX access module and a network processor so as to realize transparent data transmission between the WiMAX access module and the network processor; the network processor, used to process the WiMAX wireless data received from the switching module.

Wherein, the switching module connects to the WiMAX access module and the network processor via two MII interfaces respectively.

Wherein, when the WiMAX access module receives the downlink transmission of the WiMAX wireless data from the WiMAX network end, the switching module transparently transmits the WiMAX wireless data received by the WiMAX access module to the network processor for processing, and the network processor transmits the processed data to the switching module for downlink switching and processing; and when the WiMAX access module transmits the uplink transmission of the WiMAX wireless data to the WiMAX network end, the network processor transparently transmits the WiMAX wireless data to the WiMAX access module via the switching module for transmission.

The switching module comprises: an external network interface sub-module, used to provide a plurality of external network interfaces; and a switching control sub-module, used to control a data switching function between the plurality of external network interfaces. The external network interfaces are RJ45 type interfaces.

The client device of the present invention further comprising a memory module, used to provide storage space of the program and data for the network processor, wherein the network processor performs the assignment and process for the memory module. The memory module is at least one of RAM (random access memory) and flash memory.

By the client device of the present invention, the problem of selecting network processor with MII interface is converted into the problem of selecting network switching chip with MII interface, thus the problem is simplified, the cost is reduced and the extensibility is improved.

BRIEF DESCRIPTION OF THE DRAWINGS

The accompanying drawings herein are used to provide a further understanding of the present invention and constitute a part of the present application. The exemplary embodiments of present invention and description thereof are used to explain the present invention, and shall not be construed as limitations on the same. In the accompanying drawings.

DETAILED DESCRIPTION OF THE EMBODIMENTS

The embodiment of the present invention is described in detail with reference to the accompanying drawings.

Figure 1:
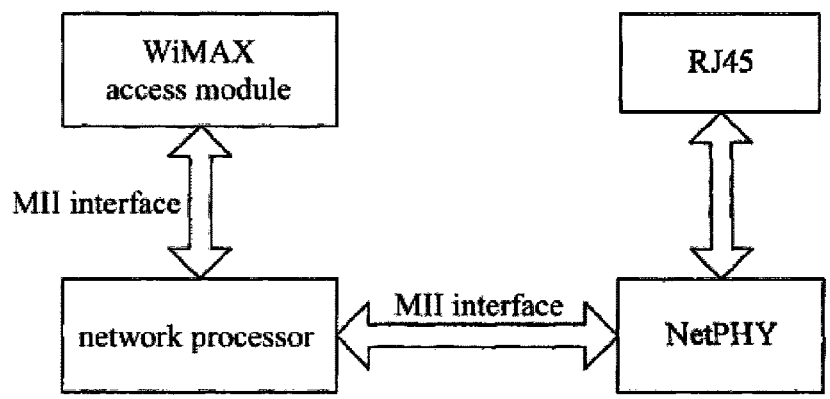
FIG. 1 shows the WiMAX CPE solution based on MII interface of prior art.
Figure 2:
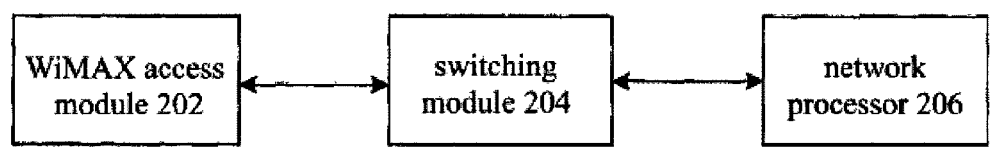
FIG. 2 is the block diagram showing the client device according to the present invention.

As shown in FIG. 2, the client device provided by the present invention comprises: WiMAX access module 202, which is used to access a WiMAX network and receive the WiMAX wireless data from the WiMAX network; switching module 204, which is used to be connected between the WiMAX access module and a network processor so as to realize the transparent transmission of WiMAX wireless data between the WiMAX access module and the network processor; network processor 206, which is used to process the WiMAX wireless data received from the switching module.

Wherein, the switching module connects to the WiMAX access module and the network processor via two MII interfaces respectively.

Wherein, when the WiMAX access module receives the downlink transmission of the WiMAX wireless data from the WiMAX network end, the switching module transparently transmits the WiMAX wireless data received by the WiMAX access module to the network processor for processing, and the network processor transmits the processed data to the switching module for downlink switching and processing; and when the WiMAX access module transmits the uplink transmission of the WiMAX wireless data to the WiMAX network end, the network processor transparently transmits the WiMAX wireless data to the WiMAX access module via the switching module for transmission.

The switching module comprises: an external network interface sub-module, which is used to provide a plurality of external network interfaces; and a switching control sub-module, which is used to control a data switching function between the plurality of external network interfaces. The external network interfaces are RJ45 type interfaces.

The client device of the present invention also comprises a memory module, which is used to provide storage space of the program and data for the network processor, wherein the network processor performs the assignment and process for the memory module. The memory module is RAM (Random Access Memory) and/or flash memory (flash).

Figure 3:
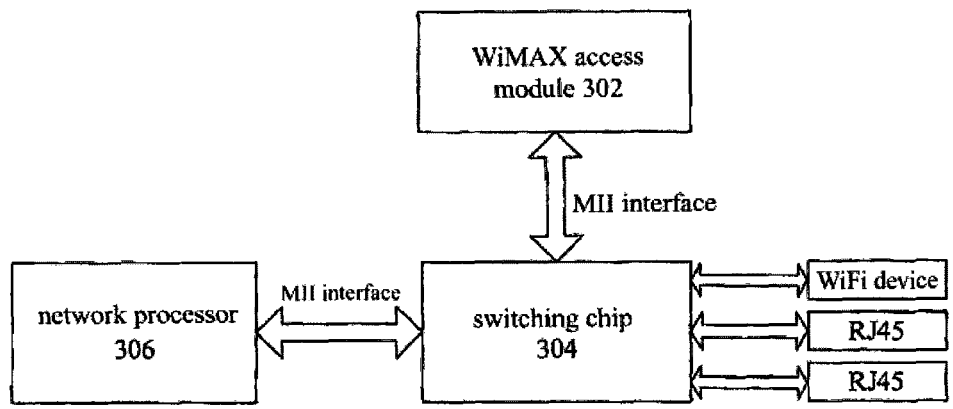
FIG. 3 is the block diagram showing the WiMAX CPE device based on MII interface of one embodiment of the present invention.

FIG. 3 is the block diagram showing the WiMAX CPE device based on MII interface of one embodiment of the present invention. The WiMAX CPE device comprises WiMAX access module 302, switching module 304 and network processor 306. The WiMAX access module provides data access of WiMAX and switches data with the network processor via the MII interface; instead of MII interface, a switching module is employed to realize data connection and interaction between the WiMAX access module and network processor; transparent transmission of data is realized between the MII interfaces of switching module.

When data is transmitted on the downlink, the WiMAX access module transparently transmits the WiMAX wireless data received from the WiMAX network to the network processor for processing via the switching module, and the network processor transmits the processed data to the switching module for downlink switching and process; and when data is transmitted on the uplink, the network processor directly and transparently transmits the network data to the WiMAX access module via the switching module for transmission.

The switching module provides the physical transmission link between the WiMAX access module and the network processor, realizes a part of switching function, and provides external multiplex network interfaces, such as RJ45 interface. Such a structure has a relative low requirement on the network processor and only requires one MII interface, at the same time, this structure has an excellent extensibility. Via the novel structure, the problem of selecting the network processor with multiplex MII interface is converted into the problem of selecting the network switching chip with multiplex MII interface, the network switching chip with the multiplex MII interface and a plurality of output ports can be easily commercial available. Thus the problem is simplified, the cost is reduced and the extensibility is improved.

Figure 4:
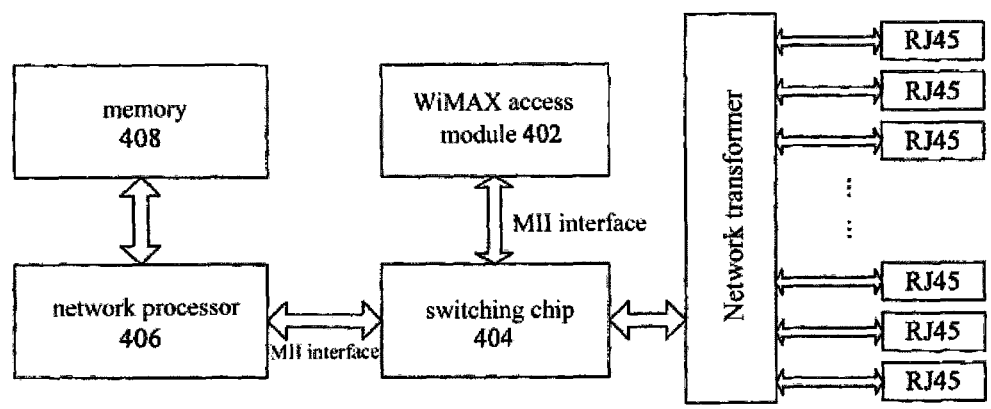
FIG. 4 is the block diagram showing the WiMAX CPE device based on MII interface of another embodiment of the present invention.

FIG. 4 is the block diagram showing the WiMAX CPE device based on MII interface of another embodiment of the present invention. The device comprises WiMAX access module 402 based on MII, switching module 404, network processor 406, memory 408 and a power source (not shown). The memory is a RAM and/or a flash memory. The uplink/downlink wireless data is received/transmitted via the WiMAX access module, the data is communicated via the switching module and network processor, wherein network processor processes the data and transmits it to the external network interface, such as a RJ45 interface, by the network switching circuit, thus the wireless data access is realized.

Since the present invention can be widely applied, the CPE terminals products for the wireless data of WiMAX, WCDMA, TD-SCDMA, CDMA-EVDO and GSM aimed to provide wireless access function can utilize the present invention to solve the problem of selecting the type of network processor and the problem of compatible extensibility, thus the present invention has wide application range and can be easily performed.

Above description is to illustrate the preferred embodiments not limit the present invention. Various alterations and changes to the present invention are apparent to those skilled in the art. The scope defined in claims shall comprise any modification, equivalent substitution and improvement in the spirit and principle of the present invention.

What is claimed is:

1. A wireless mobile communication device, comprising:
    a WiMAX access module, used to access a WiMAX network and receive WiMAX wireless data from the WiMAX network;
    a switching module, used to be connected to the WiMAX access module and a network processor via a respective Media Independent Interface (MII) so as to realize transparent data transmission between the WiMAX access module and the network processor; and
    the network processor, used to process the WiMAX wireless data received from the switching module, wherein there is one and only one MII connection between the network processor and the switching module,
    wherein when the WiMAX access module receives a downlink transmission of the WiMAX wireless data from the WiMAX network, the switching module transparently transmits the WiMAX wireless data received by the WiMAX access module to the network processor for processing, and the network processor transmits the processed data to the switching module for downlink switching and processing, and when the WiMAX access module transmits a uplink transmission of the WiMAX wireless data to the WiMAX network, the network processor transparently transmits the WiMAX wireless data to the WiMAX access module via the switching module for transmission,
    wherein the switching module further comprises:
        an external network interface sub-module, used to provide a plurality of external network interfaces; and
        a switching control sub-module, used to control a data switching function between the plurality of external network interfaces.

2. The wireless mobile communication device according to claim 1, wherein the external network interfaces include a plurality of RJ45 type interfaces and a WiFi interface.

3. The wireless mobile communication device according to claim 2, further comprising a memory module, used to provide storage space of the program and data for the network processor, wherein the network processor performs the assignment and process for the memory module.

4. The wireless mobile communication device according to claim 3, wherein the memory module is a RAM and/of a flash memory.

* * * * *